(12) United States Patent
Kurupati

(10) Patent No.: US 8,279,240 B2
(45) Date of Patent: Oct. 2, 2012

(54) VIDEO SCALING TECHNIQUES

(75) Inventor: Sreenath Kurupati, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1038 days.

(21) Appl. No.: 12/286,304

(22) Filed: Sep. 29, 2008

(65) Prior Publication Data

US 2010/0079497 A1 Apr. 1, 2010

(51) Int. Cl.
*G09G 5/00* (2006.01)
*G06K 9/40* (2006.01)

(52) U.S. Cl. ........ 345/660; 345/670; 345/671; 345/629; 345/639; 382/260; 382/263; 382/264; 382/265

(58) Field of Classification Search .................. None
See application file for complete search history.

(56) References Cited

U.S. PATENT DOCUMENTS

| | | | |
|---|---|---|---|
| 6,661,427 B1 * | 12/2003 | MacInnis et al. ............. | 345/660 |
| 7,151,863 B1 | 12/2006 | Bradley et al. | |
| 7,254,277 B2 * | 8/2007 | Kempf et al. ................. | 382/260 |
| 2004/0125113 A1 * | 7/2004 | Kempf et al. ................. | 345/611 |
| 2007/0248286 A1 * | 10/2007 | Li et al. ......................... | 382/299 |
| 2007/0269129 A1 | 11/2007 | Kempf et al. | |

FOREIGN PATENT DOCUMENTS

WO 2003/051035 A1 6/2003

OTHER PUBLICATIONS

Office Action received for Chinese Patent Application No. 200910204999.0, mailed on Jul. 27, 2011, 18 pages of Chinese Office Action including 11 pages of English Translation.
European Search Report received for European Patent Application No. 09252306.7, mailed on Jun. 1, 2011, 6 pages of European Search Report.
Office Action Received in Chinese Patent Application No. 200910204999.0, mailed on Mar. 1, 2012, 9 pages of Office Action, including 5 pages of English translation.

* cited by examiner

*Primary Examiner* — Tize Ma
(74) *Attorney, Agent, or Firm* — Glen B. Choi

(57) ABSTRACT

A video scaler is disclosed. A polyphase filter can be used to generate interpolated pixels. The values of pixels adjacent an interpolated pixel are examined to determine variation in values among the adjacent pixels to determine minimum and maximum value variations. The value of the interpolated pixel is limited based on the minimum and maximum value variations. Ringing artifacts can be reduced by limiting the color range of an interpolated pixel.

16 Claims, 4 Drawing Sheets

Input pixel stream

Output pixel stream (scaled up 2x)

PSEUDO CODE FOR TRACKING THE LOCATIONS OF INTERPOLATED PIXELS:

Phase_acc = 0;

num_output_pixels = num_input_pixels*1/isf

```
For(i=0;i<num_output_pixels;i++) {
        center_input_pixel = floor(phase_acc);
        phase_acc = phase_acc + isf;
          phase = fractional(phase_acc);
}
```

| Phase_acc | center_input_pixel |
|---|---|
| 0 | 0 |
| 0.5 | 0 |
| 1 | 1 |
| 1.5 | 1 |
| 2 | 2 |
| 2.5 | 2 | right_max = max(Right Window);
right_min = min(Right Window);
right_var = right_max − right_min;

left_max = max(Left Window);
left_min = min(Left Window);
left_var = left_max − left_min;

allowed_var = min(right_var, left_var);

allowed_high_val = max(center_pixels) + allowed_var;
allowed_low_val = min(center_pixels) − allowed_var;

VIDEO SCALING TECHNIQUES

FIELD

The subject matter disclosed herein relates generally to techniques to scale images.

RELATED ART

Image scaling involves enlarging or reducing the size of an image. A polyphase filter is often used to scale images. The quality of a scaled image tends to increase as the number of polyphase filter taps increases. Theoretically, a filter with many taps works well for video scaling. However, for graphics and artificially created or rendered images, scaling of such images using a multi-tap polyphase filter can produce a ringing artifact. One form of ringing is the bleeding of a color of a pixel into neighboring pixels. The ringing artifact is most noticeable around single pixel transitions among dissimilar colors.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
FIG. 1 depicts a prior art technique used in generating interpolated pixels during scaling.
Figure 1:

FIG. 1 depicts a pseudo code of a prior art technique used to generate interpolated pixels during scaling as well as an example of an input pixel stream and a scaled output pixel stream. An input pixel stream includes pixels numbered 0 to 9. In this example, a scaling of two times is applied. Accordingly, the output pixel stream includes twice as many pixels as those in the input pixel stream. Interpolated pixels (shown as "In") are inserted between input pixels.

Referring next to the prior art pseudo code in FIG. 1, variable num_input_pixels represents a number of input pixels, which is 10 in this example. Variable num_output_pixels represents a number of output pixels after the scaling. In this example, variable num_output_pixels is 2*10 or 20.

Variable phase_acc causes pixels in the output video stream to be present at increments of variable isf. Variable isf is 1/scaling factor and accordingly, variable isf is 0.5 in this example. The phase_acc of the first pixel is 0 whereas the phase_acc of the first interpolated pixel is 0.5 because it is positioned between input pixels numbered 0 and 1. The phase_acc of the second interpolated pixel is 1.5, and so forth. Variable center_input_pixel represents the number of the input pixel prior to an interpolated pixel. Variable phase is the fraction portion of the variable phase_acc. Other numbering schemes can be used to account for pixels.

Figure 2:
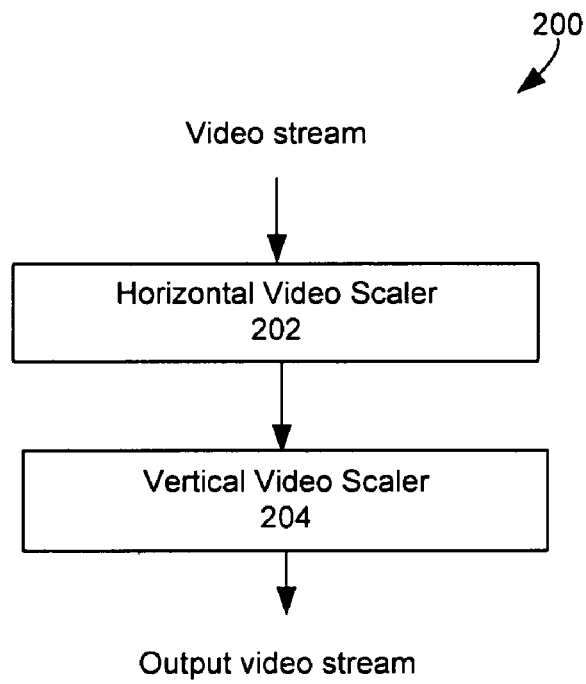
FIG. 2 depicts a video scaler, in accordance with an embodiment of the present invention.

FIG. 2 depicts a simplified block diagram of video scaler 200, in accordance with an embodiment of the present invention. Scaler 200 includes a horizontal video scaler 202 and a vertical video scaler 204. Vertical video scaling can precede or follow horizontal video scaling. An input video stream is provided to the horizontal video scaler 202. The input video stream can be provided by any video source such as a video decoder or via an HDMI cable. Vertical video scaling may scale a column of pixels in an image. Horizontal video scaling may scale a row of pixels in an image. The output video stream can be provided to at least a display or a video processing block.

Figure 3:
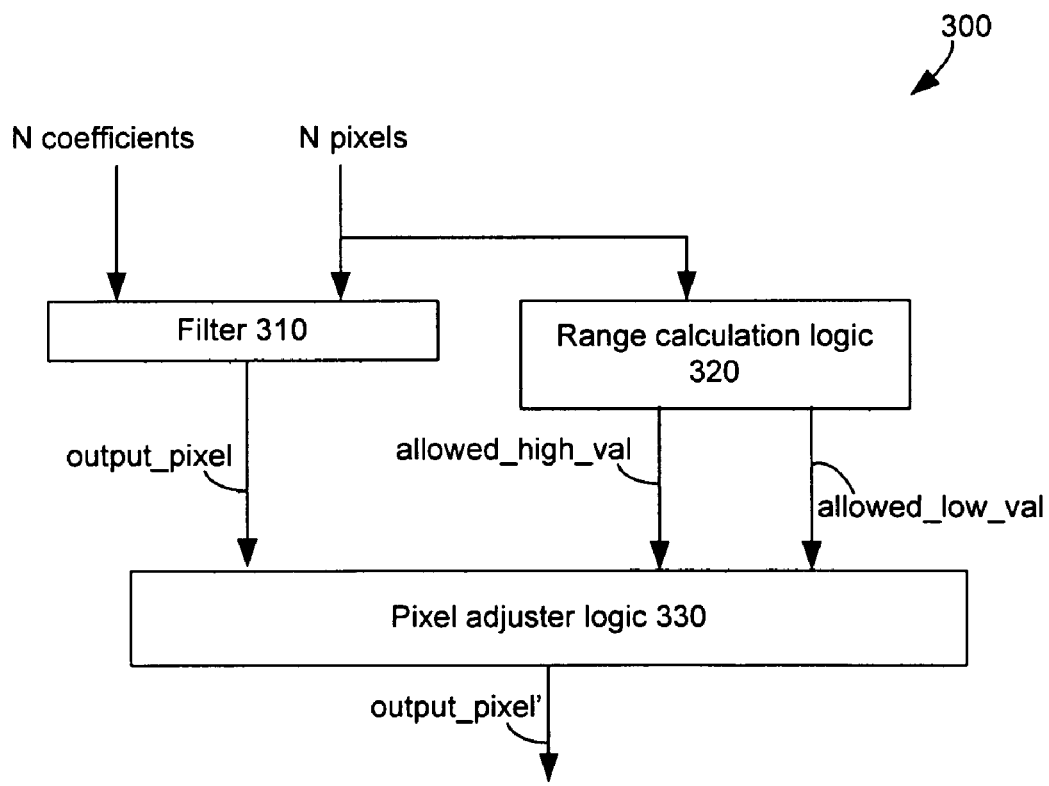
FIG. 3 depicts a video scaling system, in accordance with an embodiment of the present invention.

FIG. 3 depicts a simplified block diagram of video scaling system 300, in accordance with an embodiment of the present invention. System 300 can be used in a vertical or horizontal video scaler. System 300 includes filter 310, range calculation logic 320, and pixel adjuster logic 330. System 300 may perform video scaling for a row of pixels (in a horizontal video scaler) or column of pixels (in a vertical video scaler).

For example, each pixel may be represented as a value. Pixels may be encoded as an RGB value. In such case, system 300 may limit the RGB value of each pixel. Pixels may be encoded as YCbCr, where Y for instance denotes a luminance value, Cb denotes a blue-difference chroma, and Cr denotes a red-difference chroma. In such case, system 300 may limit Y, Cb, and Cr values of each pixel.

Filter 310 may perform polyphase filtering on M pixels and using N coefficients, where M and N are integers. Although not depicted, the coefficients used for polyphase filtering can be stored in memory. Filter 310 may generate interpolated pixels based on input pixels. Filter 310 may output pixels and interpolated pixels as "output_pixel."

Range calculation logic 320 may determine a minimum value (variable allowed_low_val) and maximum value (variable allowed_high_val) of each pixel, output_pixel from filter 310. In various embodiments, range calculation logic 320 uses the pseudo code of FIG. 4 to determine a minimum and maximum value of each pixel. Range calculation logic 320 may check the pixels closest to the interpolated pixel (center pixels) to determine if the value of the interpolated pixel is within a value range of the pixels nearest to the interpolated pixel.

Figure 4:
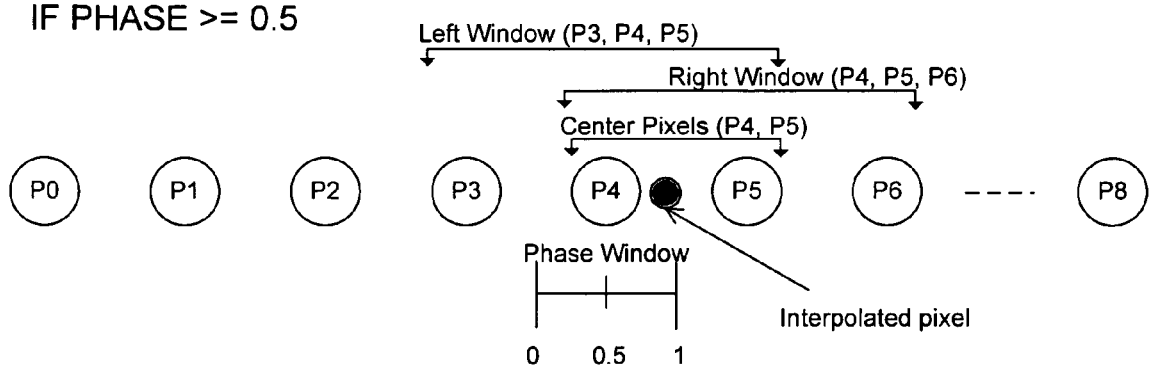
FIG. 4 depicts pseudo code that can be used to determine the minimum and maximum values of pixels, in accordance with an embodiment of the present invention.
Figure 4:
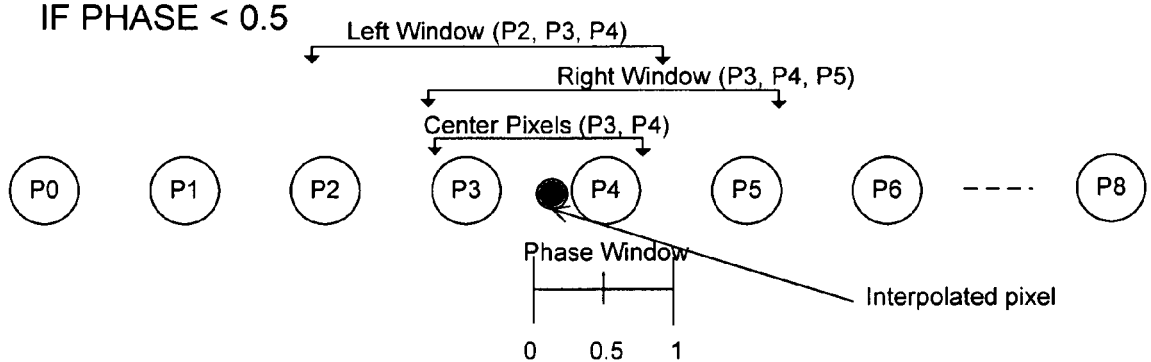

FIG. 4 depicts pseudo code that can be used to determine the minimum value (variable allowed_low_val) and a maximum value (variable allowed_high_val) based on a phase of the interpolated pixel. The phase associated with each interpolated pixel can be determined using variable "phase" from the pseudo code of FIG. 1.

Referring again to FIG. 4, if the phase of the interpolated pixel is greater than or equal to 0.5, then the center pixels are pixels P4 and P5 and the left window is pixels P3-P5 and the right window is pixels P4-P6. If the phase of the interpolated pixel is less than 0.5, then the center pixels are pixels P3 and P4 and the left window is pixels P2-P4 and the right window is pixels P3-P5. Based on the pixel values in the center pixels, right window, and left window, the pseudo code of FIG. 4 is used to determine the minimum and maximum values.

Variable right_max may represent the maximum pixel value of the pixel in the right window whereas right_min may represent the minimum pixel value of the pixel in the right window. Variable right_var may indicate the difference in values between the maximum and minimum pixel values in the right window. Similarly, variable left_max may indicate the maximum pixel value of the pixel in the left window whereas left_min may indicate the minimum pixel value of the pixel in the left window. Variable left_var may indicate the difference in values between the maximum and minimum pixel values in the left window.

Variable allowed_var may represent the lesser of the value differences in the left and right windows. Variable allowed_high_val may represent the maximum value of the center pixels plus variable allowed_var. Variable allowed_low_val may represent the minimum value of the center pixels minus variable allowed_var. Variables allowed_high_val and allowed_low_val may represent the respective maximum and minimum pixel values for each pixel from filter 310.

Pixel adjuster logic 330 may selectively adjust a pixel value of each pixel, including interpolated pixels. However, in some embodiments, pixel adjuster logic 330 may selectively adjust values of interpolated pixels. If the value of the pixel is greater than a maximum value, then pixel adjuster logic 330 may set the pixel value to be the maximum value, variable allowed_high_val. If the value of the pixel is less than the minimum value, then pixel adjuster logic 330 may set the pixel value to be the minimum value, variable allowed_low_val. Pixel adjuster logic 330 outputs each pixel depicted as output_pixel'. Limiting the value range of a pixel may reduce ringing artifacts.

For example, if pixels P3-P6 are grey but pixels P0-P2 and P7-P8 are white then when a polyphase filter considers 9 pixels, it can cause creep of the white color from neighboring pixels into the interpolated pixel. Range calculation logic 320 may check the pixels closest to the interpolated pixels to see if the center region is a tightly composed value range. By limiting the value range of the pixels to the tightly composed color range, ringing may be reduced.

In another embodiment, filter 310 may use a polyphase filter with a shorter pixel window, e.g., 4 pixels, to potentially reduce image creep but the resulting scaled video may not be as sharp as that produced using more pixels. By limiting a range of a pixel value in order to reduce ringing, system 300 may preserve the sharpness feature of a polyphase filter but employ a check to reduce color creep.

Figure 5:
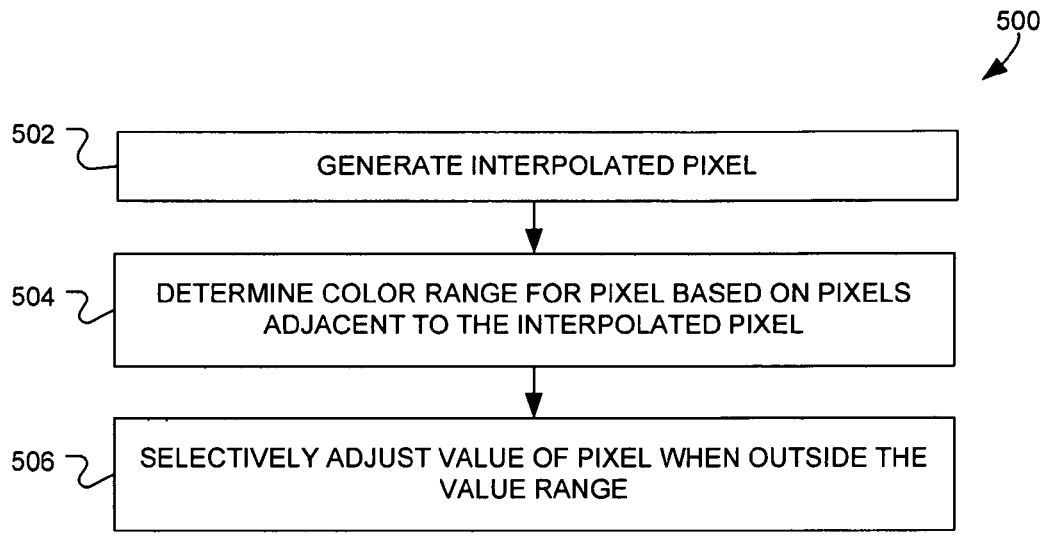
FIG. 5 depicts a flow diagram of a manner to manage the value range of pixels, in accordance with an embodiment of the present invention.

FIG. 5 depicts a flow diagram of a manner to manage the value range of an interpolated pixel, in accordance with an embodiment of the present invention. Block 502 may include generating an interpolated pixel. The interpolated pixel may be generated based on X other pixels and using a polyphase filter. In one example, X is 9.

Block 504 may include determining a value range for input pixels based on pixels adjacent to the interpolated pixel. The value range may be determined in a manner described with regard to FIG. 4.

Block 506 may include selectively adjusting a pixel value when any pixel value is outside the value range. If the value of the pixel is greater than a maximum value, then the pixel value is set to be the maximum value of the value range. If the value of the pixel is less than a minimum value, then the pixel value is set to be the minimum value of the value range.

Figure 6:
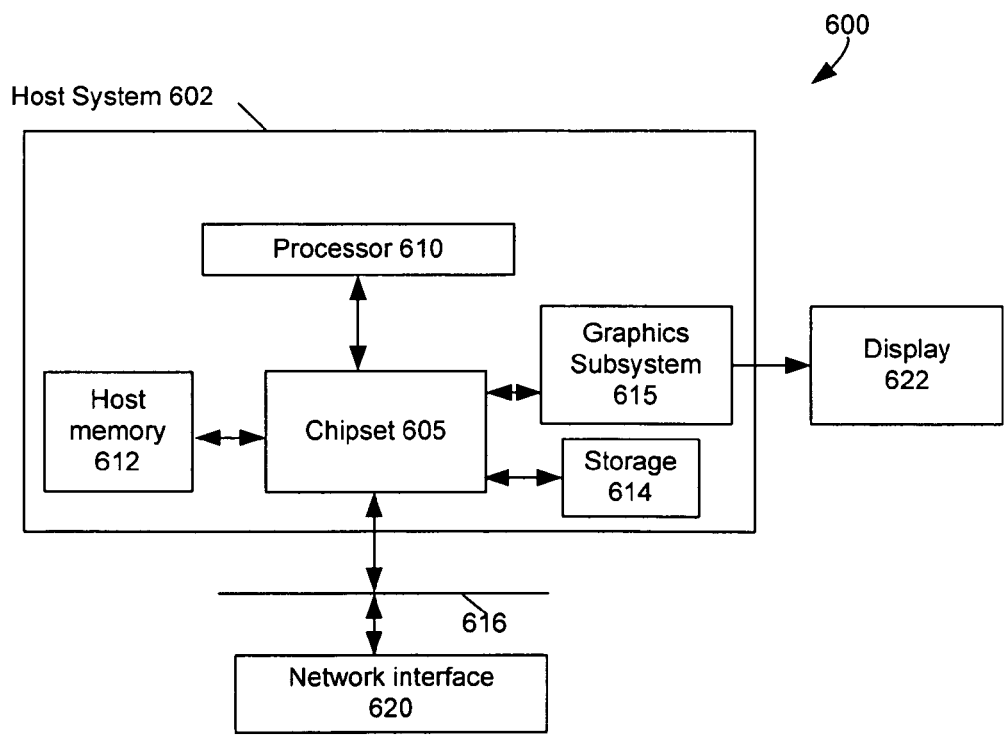
FIG. 6 depicts a system, in accordance with an embodiment of the present invention.

FIG. 6 depicts a block diagram of computer system 600, in accordance with an embodiment of the present invention. Computer system 600 may include host system 602, bus 616, and network interface 620. Host system 602 may include chipset 605, processor 610, host memory 612, storage 614, and graphics subsystem 615. Chipset 605 may provide intercommunication among processor 610, host memory 612, storage 614, graphics subsystem 615, and bus 616. For example, chipset 605 may include a storage adapter (not depicted) capable of providing intercommunication with storage 614. For example, the storage adapter may be capable of communicating with storage 614 in conformance with any of the following protocols: Small Computer Systems Interface (SCSI), Fibre Channel (FC), and/or Serial Advanced Technology Attachment (S-ATA).

In some embodiments, chipset 605 may include data mover logic capable of performing transfers of information within host memory 612, or between network interface 620 and host memory 612, or in general between any set of components in the computer system 600.

Processor 610 may be implemented as Complex Instruction Set Computer (CISC) or Reduced Instruction Set Computer (RISC) processors, multi-core, or any other microprocessor or central processing unit.

Host memory 612 may be implemented as a volatile memory device such as but not limited to a Random Access Memory (RAM), Dynamic Random Access Memory (DRAM), or Static RAM (SRAM). Storage 614 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 615 may perform processing of images such as still or video for display. For example, graphics subsystem 615 may perform video encoding or decoding. For example, graphics subsystem 615 may scale the size of video or images for display on display 622. An analog or digital interface may be used to communicatively couple graphics subsystem 615 and display 622. For example, an application executed by processor 610 may request graphics subsystem 615 to request graphics subsystem 615 to scale the size of displayed video or images. Graphics subsystem 615 could be integrated into processor 610 or chipset 605. Graphics subsystem 615 could be a stand-alone card communicatively coupled to chipset 605.

Bus 616 may provide intercommunication among at least host system 602 and network interface 620 as well as other peripheral devices (not depicted). Bus 616 may support serial or parallel communications. Bus 616 may support node-to-node or node-to-multi-node communications. Bus 616 may at least be compatible with Peripheral Component Interconnect (PCI) described for example at Peripheral Component Interconnect (PCI) Local Bus Specification, Revision 3.0, Feb. 2, 2004 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.1, Mar. 28, 2005, available from the aforesaid PCI Special Interest Group, Portland, Oreg., U.S.A. (as well as revisions thereof); and/or Universal Serial Bus (USB) (and related standards) as well as other interconnection standards.

Network interface 620 may be capable of providing intercommunication between host system 602 and a network in compliance with any applicable protocols. Network interface 620 may intercommunicate with host system 602 using bus 616. In one embodiment, network interface 620 may be integrated into chipset 605.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
receiving at least one pixel value;
determining an interpolated pixel value based on the at least one pixel value;
determining a range of allowed pixel values, the determining a range of allowed pixel values comprising:
determining a range of allowed pixel values based on pixels adjacent to the interpolated pixel and wherein the pixels adjacent to the interpolated pixel include a first pixel group comprising at least two pixels that are adjacent to the interpolated pixel and a third pixel that is immediately adjacent to one of the two pixels and a second pixel group comprising at least two pixels that are adjacent to the interpolated pixel and a third pixel that is immediately adjacent to another of the two pixels;
determining a first range that comprises a difference between maximum and minimum pixel values for pixels in the first pixel group;
determining a second range that comprises a difference between maximum and minimum pixel values for pixels in the second pixel group, wherein the range of allowed pixel values is between (i) a maximum pixel value of the two pixels plus the lesser of the first and second ranges and (ii) a minimum pixel value of the two pixels less the lesser of the first and second ranges; and
limiting any pixel value of the at least one pixel value and the interpolated pixel to within the range.

2. The method of claim 1, wherein the determining an interpolated pixel value comprises using polyphase filtering.

3. The method of claim 1, wherein the pixel value comprises a color value.

4. The method of claim 1, wherein the pixel value comprises at least one of a luminance value, blue-difference chroma, and red-difference chroma.

5. The method of claim 1, wherein the limiting comprises
setting any pixel value to a high value of the range in response to the pixel value being greater than a highest value in the range and
setting any pixel value to a low value of the range in response to the pixel value being less than a lowest value in the range.

6. An apparatus comprising a processor, the processor configured to:
access at least one pixel value;
determine an interpolated pixel value based on the at least one pixel value;
determine a range of allowed pixel values, wherein to determine a range of allowed pixel values, the processor is to:
determine a range of allowed pixel values based on pixels adjacent to the interpolated pixel and wherein the pixels adjacent to the interpolated pixel comprise a first pixel group comprising two pixels that are adjacent to the interpolated pixel and a third pixel that is immediately adjacent to one of the two pixels and a second pixel group comprising two pixels that are adjacent to the interpolated pixel and a third pixel that is immediately adjacent to another of the two pixels;
determine a first range that comprises a difference between maximum and minimum pixel values for pixels in the first pixel group;
determine a second range that comprises a difference between maximum and minimum pixel values for pixels in the second pixel group, wherein the range of allowed pixel values comprises (i) a maximum pixel value of the two pixels plus the lesser of the first and second ranges and (ii) a minimum pixel value of the two pixels less the lesser of the first and second ranges; and
limit any pixel value of the at least one pixel value and the interpolated pixel to within the range.

7. The apparatus of claim 6, wherein to determine an interpolated pixel value comprises use of a polyphase filter.

8. The apparatus of claim 6, wherein the pixel value comprises a color value.

9. The apparatus of claim 6, wherein the pixel value comprises at least one of a luminance value, blue-difference chroma, and red-difference chroma.

10. The apparatus of claim 6, wherein the logic to limit, the processor is to:
set any pixel value to a high value of the range in response to the pixel value being greater than a highest value in the range and
set any pixel value to a low value of the range in response to the pixel value being less than a lowest value in the range.

11. The apparatus of claim 6, wherein the processor is configured to perform horizontal or vertical video scaling.

12. A system comprising:

a display device and a graphics subsystem to generate a scaled image based on an input image, wherein the graphics subsystem is communicatively coupled to the display device and wherein the graphics subsystem is to:

access at least one pixel value, determine an interpolated pixel value based on the at least one pixel value, determine a range of allowed pixel values, wherein to determine a range of allowed pixel values, the graphics subsystem is to:

determine a range of allowed pixel values based on pixels adjacent to the interpolated pixel and wherein the pixels adjacent to the interpolated pixel comprise a first pixel group comprising two pixels that are adjacent to the interpolated pixel and a third pixel that is immediately adjacent to one of the two pixels and a second pixel group comprising two pixels that are adjacent to the interpolated pixel and a third pixel that is immediately adjacent to another of the two pixels;

determine a first range that comprises a difference between maximum and minimum pixel values for pixels in the first pixel group;

determine a second range that comprises a difference between maximum and minimum pixel values for pixels in the second pixel group, wherein the range of allowed pixel values comprises (i) a maximum pixel value of the two pixels plus the lesser of the first and second ranges and (ii) a minimum pixel value of the two pixels less the lesser of the first and second ranges, and limit any pixel value of the at least one pixel value and the interpolated pixel to within the range.

13. The system of claim 12, further comprising:

a storage device communicatively coupled to the graphics subsystem, wherein the storage device is to store the input image and the scaled image.

14. The system of claim 12, wherein to determine an interpolated pixel value comprises use of a polyphase filter.

15. The system of claim 12, wherein to limit, the graphics subsystem is to:

set any pixel value to a high value of the range in response to the pixel value being greater than a highest value in the range and set any pixel value to a low value of the range in response to the pixel value being less than a lowest value in the range.

16. The system of claim 12, wherein the display is to display the scaled image.

\* \* \* \* \*